Nov. 8, 1927.                                               1,648,539
B. D. CHAMBERLIN
PHOTOGRAPHIC FILM SPOOL
Filed June 18, 1926
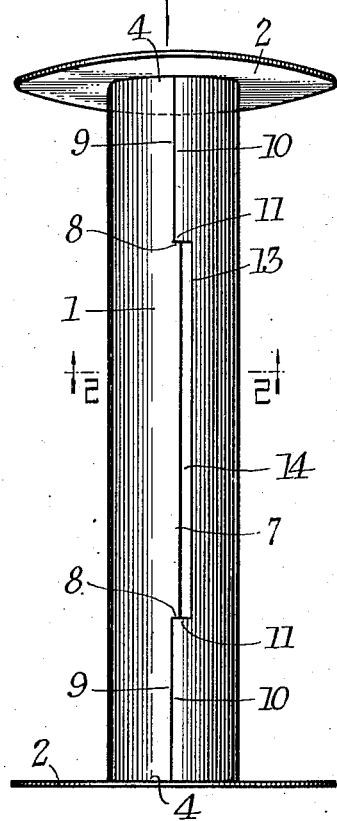
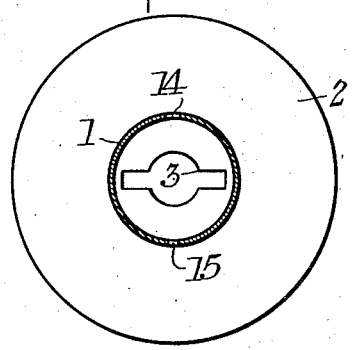
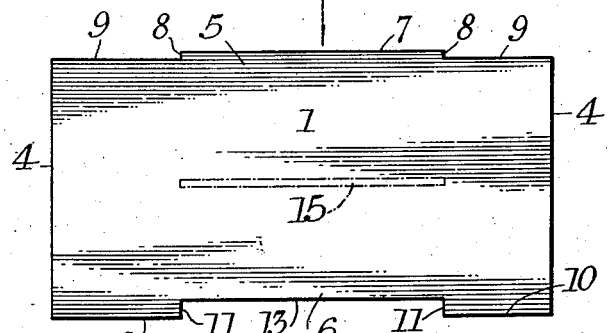
INVENTOR,
Benjamin D. Chamberlin,
BY
ATTORNEYS.

Patented Nov. 8, 1927.

1,648,539

UNITED STATES PATENT OFFICE.

BENJAMIN D. CHAMBERLIN, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM SPOOL.

Application filed June 18, 1926. Serial No. 116,954.

This invention relates to photography, and more particularly to spools for photographic purposes on which the convolutions of a photographically light sensitive emulsion coated on a base may be interwound with paper to form the commercial "film spool" or "film cartridge". One object of my invention is to provide a spool having the smallest number of parts that is consistent with good workmanship. Another object is to provide the parts of such shape that they can be economically cut from sheet stock. Another object is to provide a spool which is light in weight and which is strong. Another object is to provide a spool core which is resistant to torsional stresses and which is light and strong. Still another object is to provide a core formed from substantially rectangular shaped stock two edges of which are shouldered so that the contacting shoulders may add rigidity to the core; and other objects will appear from the following specification, the novel features being pointed out in the claims at the end thereof.

For photographic purposes the flanges of a film spool should be accurately spaced, and the spool must be light and strong. The spool core must be made resistant to torsional stresses and a smooth cylindrical shape is required, free from ridges or protuberances which may leave "pressure markings" on a film wound thereon. To compete with the commonly used wooden core spool, the cost of the parts must be kept as low as possible. My present invention is directed to providing an all metal film spool which will meet these requirements.

Coming now to the drawings wherein like reference characters denote like parts throughout:

Fig. 1 is a perspective view of a film spool constructed in accordance with and illustrating one embodiment of my invention;

Fig. 2 is a section on line 2—2 of Fig. 1, and

Fig. 3 is a plan view of a blank from which the spool core may be made.

The spool consists of a core 1 having flanges 2 at each end which may have the usual camera engaging apertures such as the cutout 3.

The core may be made from a blank as shown in Fig. 3, wherein the two ends 4 are straight and parallel so as to properly position the spool flanges 2. The side edges 5 and 6 of the blank preferably are at right angles to the ends 4 and consist of a series of straight edges.

One side 5 consists of a central straight edge 7, terminating in two abutments 8 from which the straight edges 9 continue to the ends of the blank. I prefer to form the abutments 8 at substantially right angles to the edges 7.

Side 6 includes two straight edges 10 of a length equal to the length of edges 9. Abutments 11 are parallel to abutments 8 and are of greater length than these abutments, being adapted to receive the straight edge 7 between them. Between abutments 11 is a straight edge 13.

When the blank thus made is rolled up to a cylindrical shape, the parallel edges 9 and 10 lie against each other with the thickness of the metal edges contacting, and edges 13 and 7 are spaced from each other forming a slot 14. As edge 7 fits in between abutments 11 and as abutments 11 and 8 are in contact, the ends 4 are held parallel, and the core resists torsional stresses. The core is cylindrical throughout.

I may, as shown in Fig. 2, form a slot 15 by cutting out the metal opposite the slot 14 where it is desired, but this may be omitted. In Fig. 3, the location of such a slot is indicated in dot and dash lines.

The flanges 2 may be affixed to the core ends 4 in any desired manner, welding being preferred. If desired, they may be attached as shown in my Patent No. 1,306,881, of June 17, 1919, in which case the edges 4 of the blank may be suitably flanged as shown in this patent.

Having thus described my invention, what I claim as new and desire to secure by Letters Patent is:

1. A photographic film spool comprising a core, and flanges attached to the core, said core comprising a bent sheet metal member, means for resisting torsional stresses in the core including contacting abutments on the edges of the bent up metal core, said abutments extending between parallel edges of the bent up metal core, two of the parallel edges being spaced apart whereby a slot is provided for attaching the film backing paper.

2. A photographic film spool comprising a core, and flanges attached to the core, said core consisting of a metal plate having two edges including abutments bent up into cylindrical form with the abutments in contact, said abutments being included between a series of parallel edges of the metal plate from which the core is made, two of the abutments being of greater depth than the other two abutments whereby a slot is left extending between the abutments and the two spaced metal edges, and whereby the smooth cylindrical surface of the core is retained.

3. A photographic film spool comprising a core, and flanges attached to the core, said core comprising a sheet metal member bent into tubular form and having interengaging edges, one edge of which consists of a straight edge having a flange formed thereon offset from the straight edge by abutments, the other interengaging edge consisting of a straight edge abutting the first mentioned straight edge, a slot offset from the straight edge by abutments of greater depth than the abutments of the flange member and against which these abutments are adapted to lie, whereby the abutments resist torsional stresses upon the core and also define the edges of a slot extending between the end of the tongue and the bottom of the groove.

4. A photographic film spool comprising a core, and flanges attached to the core, said core including a sheet metal member bent into tubular form throughout its length, a series of parallel metal edges on the core, the parallel edges toward the middle of the core being spaced whereby a slot is formed, abutments at each end of the slot, two shoulders being of greater length than the other two abutments, and all of the abutments being substantially straight whereby portions of the abutments may lie in contact to prevent distortion of the core, the parallel edges extending toward the flanges of the spool from the abutments lying against each other, whereby a smooth cylindrical surface is obtained adapted to resist torsional stresses and to support convolutions of film and protective film covering.

Signed at Rochester, New York, this 14 day of June 1926.

BENJAMIN D. CHAMBERLIN.